US012623558B2

(12) United States Patent
Lee et al.

(10) Patent No.: US 12,623,558 B2
(45) Date of Patent: May 12, 2026

(54) ELECTRIC BATTERY CHARGING SYSTEM, CONTROL METHOD THEREOF, AND VEHICLE WITH ELECTRIC BATTERY CHARGING SYSTEM

(71) Applicants: HYUNDAI MOTOR COMPANY, Seoul (KR); KIA CORPORATION, Seoul (KR); KYUNGSHIN CORP., Incheon (KR)

(72) Inventors: Kwang Moo Lee, Suwon-si (KR); Dong Seok Kim, Incheon (KR)

(73) Assignees: HYUNDAI MOTOR COMPANY, Seoul (KR); KIA CORPORATION, Seoul (KR); KYUNGSHIN CORP., Incheon (KR)

( * ) Notice: Subject to any disclaimer, the term of this patent is extended or adjusted under 35 U.S.C. 154(b) by 745 days.

(21) Appl. No.: 17/970,564

(22) Filed: Oct. 21, 2022

(65) Prior Publication Data

US 2023/0127745 A1    Apr. 27, 2023

(30) Foreign Application Priority Data

Oct. 21, 2021    (KR) ......................... 10-2021-0140992

(51) Int. Cl.
*B60L 53/16*        (2019.01)
*B60L 53/302*       (2019.01)
          (Continued)
(52) U.S. Cl.
CPC ............. *B60L 53/16* (2019.02); *B60L 53/302* (2019.02); *B60L 58/10* (2019.02); *G01K 7/22* (2013.01);
          (Continued)

(58) Field of Classification Search
CPC ........ B60L 53/16; B60L 53/302; B60L 58/10; G01K 7/22; H01C 7/04; H01R 13/6641; H01R 2201/26; H02J 7/007
          (Continued)

(56) References Cited

U.S. PATENT DOCUMENTS 8,786,261 B2 *  7/2014  Andrea ................. H02J 7/0016
                                                       320/152
8,864,373 B2 *  10/2014  Vu ........................... G01K 7/22
                                                        374/142
          (Continued)

FOREIGN PATENT DOCUMENTS

CN        109552093 A    *  1/2019
CN        218101929 U    *  12/2022    ......... H01R 138/521
          (Continued)

*Primary Examiner* — Suresh Memula
(74) *Attorney, Agent, or Firm* — MCDONNELL BOEHNEN HULBERT & BERGHOFF LLP

(57)        ABSTRACT

Provided is an electric battery charging system, including a connector including a thermistor element configured to change a resistance value according to a temperature, a micro control unit (MCU) configured to receive a voltage varying depending on whether the connector is connected, and receive a voltage varying according to the resistance value of the thermistor element, and a vehicle charging management system (VCMS) configured to determine whether to discharge a battery based on whether the connector is connected and a temperature of the connector.

20 Claims, 10 Drawing Sheets

(51) Int. Cl.

| | |
|---|---|
| *B60L 58/10* | (2019.01) |
| *G01K 7/22* | (2006.01) |
| *H01C 7/04* | (2006.01) |
| *H01R 13/66* | (2006.01) |
| *H02J 7/00* | (2006.01) |

(52) U.S. Cl.
CPC ........... *H01C 7/04* (2013.01); *H01R 13/6641* (2013.01); *H02J 7/007* (2013.01); *H01R 2201/26* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 8,947,247 B2 * | 2/2015 | Engel | ...................... | B60L 53/31 320/109 |
| 11,225,156 B2 * | 1/2022 | Miller | ...................... | B60L 53/14 |
| 11,689,044 B2 * | 6/2023 | Zhang | ............... | H02J 7/007188 320/162 |
| 11,735,787 B2 * | 8/2023 | Zuo | ...................... | H01M 10/486 320/134 |
| 11,742,686 B2 * | 8/2023 | Tsai | ...................... | H02J 7/00309 320/136 |
| 2004/0135542 A1 * | 7/2004 | Ito | ......................... | H02J 7/0045 320/107 |
| 2010/0244769 A1 * | 9/2010 | Sakakibara | ......... | H01M 50/271 320/118 |
| 2011/0050175 A1 * | 3/2011 | Odaohhara | ......... | H01M 10/443 320/136 |
| 2012/0109547 A1 * | 5/2012 | Willey | ................. | H02H 1/0015 702/58 |
| 2014/0035527 A1 * | 2/2014 | Hayashigawa | ........... | B60L 3/04 320/109 |
| 2014/0062398 A1 * | 3/2014 | Satake | .................... | B60L 58/15 320/109 |
| 2014/0232326 A1 * | 8/2014 | Wohltmann | ...... | H02J 7/007182 320/107 |
| 2014/0375264 A1 * | 12/2014 | Reddy | .................... | B60L 53/63 320/109 |
| 2015/0108950 A1 * | 4/2015 | Yun | ...................... | H02J 7/00712 320/134 |
| 2015/0123597 A1 * | 5/2015 | Son | ........................ | H02J 7/0068 320/134 |
| 2016/0137079 A1 * | 5/2016 | Jefferies | .................. | B60L 53/16 320/109 |
| 2016/0152151 A1 * | 6/2016 | Yang | ........................ | B60L 58/27 320/109 |
| 2016/0204626 A1 * | 7/2016 | Cruz | ................. | H02J 7/007188 320/152 |
| 2016/0254574 A1 * | 9/2016 | Li | ...................... | H01M 10/0525 320/107 |
| 2018/0026471 A1 * | 1/2018 | Lu | ........................... | H02J 7/007 320/134 |
| 2023/0127745 A1 * | 4/2023 | Lee | ........................ | B60L 53/16 320/109 |
| 2023/0219435 A1 * | 7/2023 | Wang | ...................... | B60L 53/16 320/109 |
| 2023/0253636 A1 * | 8/2023 | Wolf | ...................... | H01C 1/08 320/166 |

FOREIGN PATENT DOCUMENTS

| | | | | |
|---|---|---|---|---|
| DE | 19851869 A1 * | 7/2000 | ............. | H01C 7/049 |
| KR | 102064808 B1 | 1/2020 | | |
| KR | 2021-0115386 A | 9/2021 | | |

* cited by examiner

FIG. 5

| Case R set = 68 ohm (RC = 75 ohm) | | MONITORING | |
|---|---|---|---|
| S4 | S3 | PD | TEMP.M |
| S4 OPEN | S3 OPEN | 2.82V | MONITORING DATA |
| S4 CLOSED | S3 OPEN | 0.754V | |
| S4 OPEN | S3 CLOSED | 0.905V | |
| S4 CLOSED | S3 CLOSED | 0.482V | |

ELECTRIC BATTERY CHARGING SYSTEM, CONTROL METHOD THEREOF, AND VEHICLE WITH ELECTRIC BATTERY CHARGING SYSTEM

CROSS-REFERENCE TO RELATED APPLICATION

This application is based on and claims priority under 35 U.S.C. § 119 to Korean Patent Application No. 10-2021-0140992, filed on Oct. 21, 2021 in the Korean Intellectual Property Office, the disclosure of which is incorporated herein by reference.

1. Technical Field

The disclosure relates to an electric battery charging system, a control method thereof, and a vehicle with the electric battery charging system.

2. Background

In general, an electric vehicle refers to a means of transportation travelling on the road or rail using electricity.

It is a global tendency that the capacity of electric vehicle battery increases to more than 100 khw to improve a driving range of an electric vehicle.

Therefore, electric vehicles are at the center of public attention as an energy storage system (ESS).

Accordingly, research on electric vehicles equipped with the vehicle to load (V2L) function that transfers energy stored in a high voltage battery in the vehicle to an external power system is being conducted.

SUMMARY

An aspect of the disclosure provides an electric battery charging system, a control method thereof, and a vehicle with the electric battery charging system that may determine whether to discharge a battery by determining whether a connector is connected and a temperature of the connector.

Additional aspects of the disclosure will be set forth in part in the description which follows and, in part, will be obvious from the description, or may be learned by practice of the disclosure.

According to an embodiment of the disclosure, there is provided an electric battery charging system, including: a connector including a thermistor element configured to change a resistance value according to a temperature; a micro control unit (MCU) configured to receive a voltage varying depending on whether the connector is connected, and receive a voltage varying according to the resistance value of the thermistor element; and a vehicle charging management system (VCMS) configured to determine whether to discharge a battery based on whether the connector is connected and a temperature of the connector.

The thermistor element includes a negative temperature coefficient (NTC) thermistor element.

The VCMS is configured to stop discharging the battery, when a voltage varying according to a resistance value of the NTC thermistor element is less than or equal to a preset reference value.

The connector further includes a proximity detection sensor configured to detect the voltage varying depending on whether the connector is connected.

The VCMS is configured to stop discharging the battery, when the voltage varying depending on whether the connector is connected is greater than or equal to a preset reference value.

The connector further includes a light emitting diode (LED) configured to light up based on stop of discharge.

The connector further includes a bimetal switch configured to cut off power according to the temperature of the connector.

The thermistor element is sealed inside the connector to prevent ingress of moisture.

According to an embodiment of the disclosure, there is provided a vehicle, including: an MCU configured to receive a voltage varying depending on whether a connector is connected, and include a thermistor element that changes a resistance value according to a temperature and receive a voltage varying according to the resistance value of the thermistor element; and a VCMS configured to determine whether to discharge a battery based on whether the connector is connected and a temperature of the connector.

The thermistor element includes a NTC thermistor element.

The VCMS is configured to stop discharging the battery, when a voltage varying according to a resistance value of the NTC thermistor element is less than or equal to a preset reference value.

The connector further includes a proximity detection sensor configured to detect the voltage varying depending on whether the connector is connected.

The VCMS is configured to stop discharging the battery, when the voltage varying depending on whether the connector is connected is greater than or equal to a preset reference value.

The connector further includes a LED configured to light up based on stop of discharge.

The connector further includes a bimetal switch configured to cut off power according to the temperature of the connector.

The thermistor element is sealed inside the connector to prevent ingress of moisture.

According to an embodiment of the disclosure, there is provided a control method of an electric battery charging system, the control method including: receiving a voltage varying depending on whether a connector is connected, the connector including a thermistor element configured to change a resistance value according to a temperature; receiving a voltage varying according to the resistance value of the thermistor element; determining whether the connector is connected and a temperature of the connector; and determining whether to discharge a battery based on whether the connector is connected and the temperature of the connector.

When the thermistor element is a NTC thermistor element and a voltage varying by the NTC thermistor element is less than or equal to a preset reference value, the control method further includes stopping discharge.

The control method further includes detecting, by a proximity detection sensor included in the connector, the voltage varying depending on whether the connector is connected; and when the detected voltage is greater than or equal to a preset reference voltage, determining that the connector is disconnected and stopping discharge.

The connector further includes a LED configured to light up based on stop of discharge.

The connector further includes a bimetal switch configured to cut off power according to the temperature of the connector.

The thermistor element is sealed inside the connector to prevent ingress of moisture.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a diagram illustrating a voltage by a proximity detection sensor detected in an electric battery charging system according to an embodiment;

DETAILED DESCRIPTION

Figure 1:
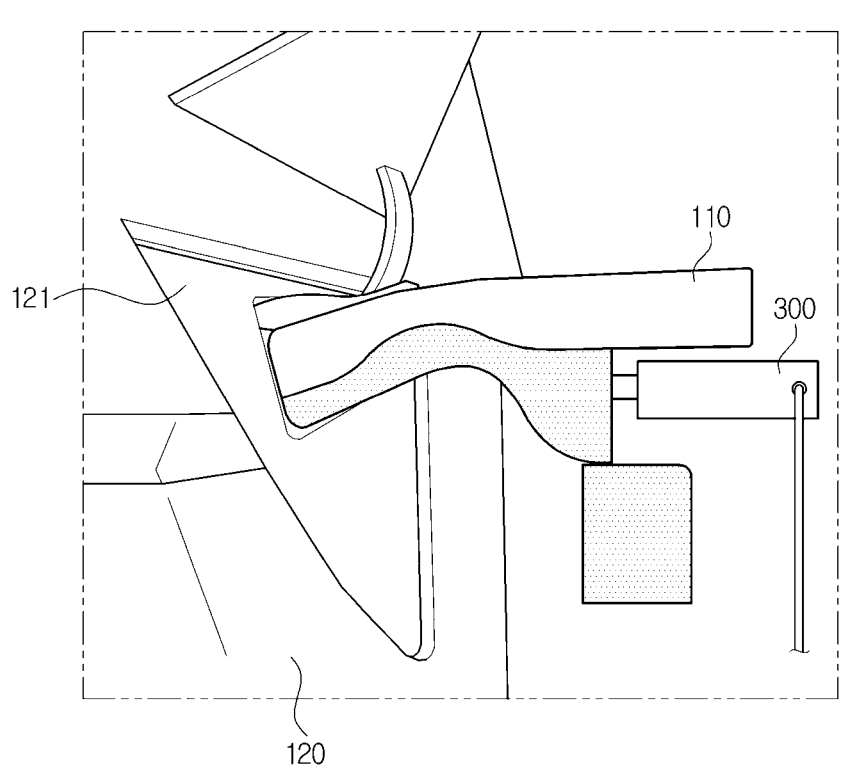
FIG. 1 illustrates an appearance during operation of an electric battery charging system according to an embodiment.

The embodiments set forth herein and illustrated in the configuration of the disclosure are only preferred embodiments, so it should be understood that they may be replaced with various equivalents and modifications at the time of the disclosure.

Like reference numerals throughout the specification denote like elements. Also, this specification does not describe all the elements according to embodiments of the disclosure.

It is to be understood that the singular forms are intended to include the plural forms as well, unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Also, the terms including ordinal numbers like "first" and "second" may be used to explain various components, but the components are not limited by the terms and the terms are only for the purpose of distinguishing a component from another. For example, without departing from the technical spirit or essential features of the disclosure, a first element may be referred to as a second element, and also a second element may be referred to as a first element. Description shall be understood as to include any and all combinations of one or more of the associated items when the items are described by using the conjunctive term "~and/or ~", or the like.

Also, the terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, in read only memory (ROM), random access memory (RAM), magnetic tapes, magnetic disks, flash memories, optical recording medium, and the like.

Hereinafter, embodiments of an electric battery charging system 100 for a vehicle 120, a control method thereof, and the vehicle 120 with the electric battery charging system 100 according to an aspect of the disclosure will be described in detail with reference to the accompanying drawings.

FIG. 1 illustrates an appearance during operation of an electric battery charging system 100 according to an embodiment.

Referring to FIG. 1, the electric battery charging system 100 may be configured so that a connector is inserted into an inlet 121 of a charging port positioned on an outer surface of a vehicle 120.

The connector is configured so that the connector is inserted into the inlet 121 of the vehicle 120 and at the same time, a plug of an external electronic product 300 is inserted into the connector, thereby implementing a vehicle to load (V2L) technology.

The V2L technology is a technology capable of supplying power of a battery of the vehicle 120 to an external device. For example, general home appliances (laptops, microwave ovens, etc.) may be used by plugging them into the vehicle 120.

The V2L may supply 3.6 kW, similar to 2 to 4 kW based on general households, and also supply power to an outside without additional equipment through a vehicle charging management system (VCMS) 122.

The V2L may be one of a vehicle to grid (V2G) concepts that support bidirectional charging, and the V2G may refer to transferring electricity from the vehicle 120 to a power grid.

That is, the V2G may refer to a technology that connects a battery of an electric vehicle to a power system, by using the battery of the electric vehicle like an energy storage system (ESS).

Because an electric vehicle for V2G requires the ability to discharge electricity from the battery to an outside, a key component may be a bidirectional on-board charger 200.

A bidirectional power control circuit, including a step-up/step-down converter and an alternating current-direct current (AC-DC) converter for converting DC and AC in both directions and synchronizing voltage and power frequency with the power grid, may be applied to the bidirectional on-board charger 200.

Although an existing charger uses a unidirectional AC-DC converter only for battery charging, a bidirectional AC-DC converter may be used for the bidirectional on-board charger 200 for V2G.

A two-stage AC-DC converter configured as a power factor correction (PFC) and an isolated DC-DC converter circuit may be used as the unidirectional charger.

Specifically, a bridgeless PFC circuit or a step-up PFC circuit using a full-wave rectifier diode may be mainly used as the PFC, and a phase shift full-bridge (PSFB) converter or an LLC resonant converter may be mainly used as the DC-DC converter.

A diode having a directionality is installed in the above-described unidirectional charger, which may not be applied to the bidirectional on-board charger 200.

Accordingly, the bidirectional on-board charger 200 may support charging and discharging in both directions by using a full-bridge type inverter instead of the PFC circuit.

As described above, for the V2L technology, a connector functioning as the bidirectional on-board charger 200 is required, and securing a stability of the connector is required. The electric battery charging system 100 according to an embodiment may be provided to secure the stability of the connector.

Figure 2:
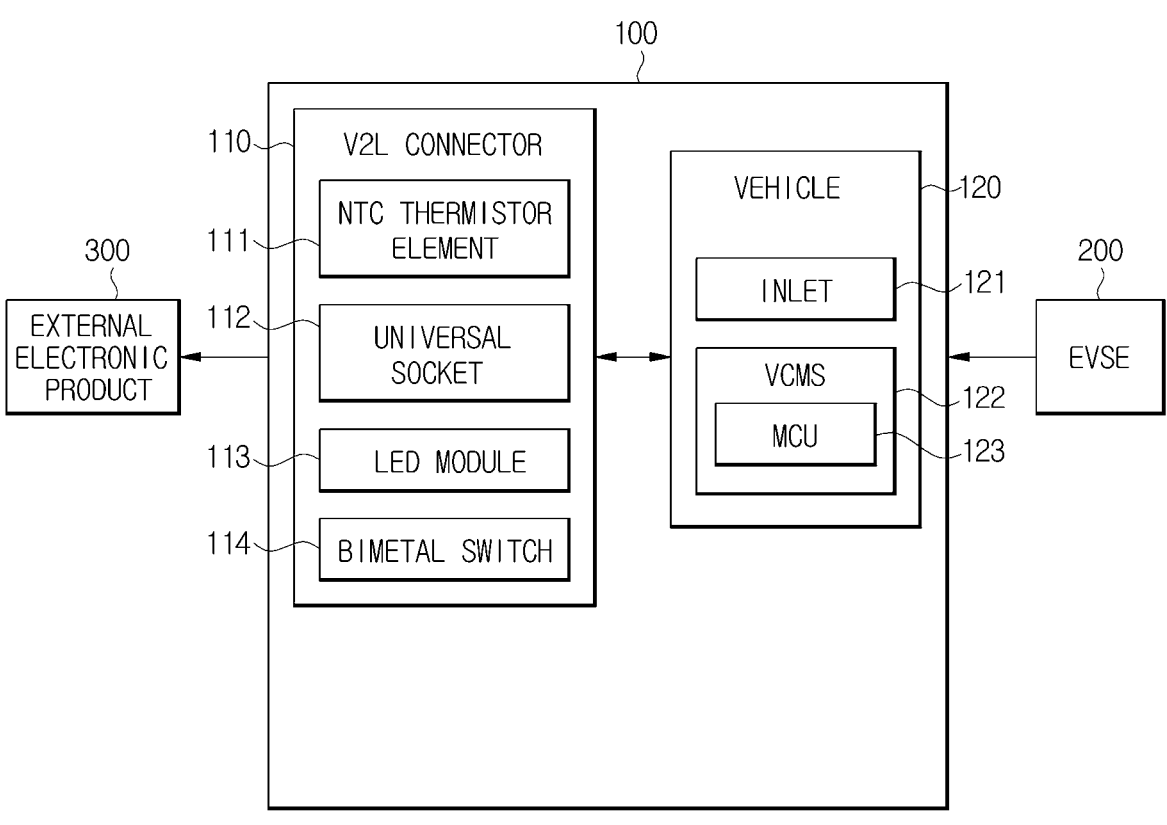
FIG. 2 is a control block diagram illustrating an electric battery charging system according to an embodiment.

FIG. 2 is a control block diagram illustrating the electric battery charging system 100 according to an embodiment. A configuration of the electric battery charging system 100 according to an embodiment is described in detail with reference to FIG. 2.

The electric battery charging system 100 may receive power from an electric vehicle supply equipment (EVSE) 200 of an electric charging station to charge a battery.

The EVSE 200 of the electric battery may be largely divided into a slow charger and a fast charger. The slow charger may use a method of charging with low energy of approximately 7 kW or less, and the fast charger may use a method of charging with high energy of 50 kW or more.

The fast charger charges a battery mounted on a vehicle by converting AC power to DC power or converting renewable energy DC power to DC-DC, and may have a fast charging speed because a rectifier and a DC-DC converter are separated from an external charging system.

In the slow charger, the rectifier and DC-DC converter are an on-board charger for generating electric power conversion and the vehicle is structurally only capable of small-capacity conversion. Accordingly, the slow charger has a slow charging speed.

According to an embodiment, the electric battery charging system 100 may discharge the battery in order to supply power to the external electronic product 300.

The external electronic product 300 may refer to all electronic products including home appliances using a 220V plug used at home. Accordingly, the electric battery charging system 100 may secure consumer electronics connectivity.

For example, the external electronic product 300 may include a TV, beam projector, vacuum cleaner, refrigerator, air purifier, humidifier, electric rice cooker, microwave oven, electric kettle, coffee maker, blender, hair dryer, electric fan, and the like. That is, the type of external electronic product 300 is not limited as long as it can be connected to a connector.

According to an embodiment, the electric battery charging system 100 may include a V2L connector 110.

The V2L connector 110 may be connected to the external electronic product 300, and discharge the electric battery to supply power to the external electronic product 300. Specifically, the V2L connector 110 may supply power to the external electronic product 300 by converting DC power of the electric battery to AC.

The V2L connector 110 may include a negative temperature coefficient (NTC) thermistor element. A thermistor element is a type of resistor and may be an electrical device using a property that a resistance of a material changes according to temperature.

Assuming that a resistance of thermistor changes linearly with temperature change, a relationship between resistance and temperature may be expressed as, $$\Delta R = k \Delta T$$

Here, $\Delta R$ is the amount of change in resistance, $\Delta T$ is the amount of change in temperature, and k is a first temperature coefficient of resistance.

A thermistor may be largely divided into a positive temperature coefficient (PTC) thermistor and the NTC thermistor according to a temperature coefficient of resistance.

When k is greater than 0, a resistance of thermistor increases with temperature, and the PTC thermistor has such a characteristic. By contrast, when k is less than 0, a resistance of thermistor decreases as the temperature increases, and the NTC thermistor has such a characteristic.

A general resistor is manufactured so that a value of k is as close to 0 as possible, and is adjusted so that almost no change in resistance depending on temperature occurs. However, the thermistor may be manufactured so that a change in resistance due to a small temperature change occurs greatly in order to be used as a sensor that detects a temperature of a circuit.

The thermistor used in the electric battery charging system 100 according to an embodiment may be applied when a resistance value changes according to temperature. However, a following description is made with an assumption that an NTC thermistor element 111 where a resistance value changes at a relatively constant rate according to temperature and which is generally applied to the vehicle 120.

The V2L connector 110 may include a universal socket 112. The universal socket 112 may be provided at the other end of an end connected to the inlet 121 of the vehicle 120.

The universal socket 112 may accept a plug of the external electronic product 300, and refer to a socket capable of accepting all plugs having different pin types.

Types of plugs may be classified by the International Electrotechnical Commission, and South Korea uses the type F and the United States uses the type A.

The V2L connector 110 is provided with the universal socket 112 to provide a V2L function regardless of a plug type of an external home appliance, and also no additional gender according to the plug type is required.

According to an embodiment, the V2L connector 110 may include a light emitting diode (LED) module 113.

The LED module 113 may be embodied by modularizing a plurality of LEDs, and may be used to notify a user of whether the V2L connector 110 is connected and whether the V2L function operates.

The LED module 113 may be turned on according to a warning state determined by the VCMS 122. The warning state may refer to an abnormal operation state such as an error in connection state of the V2L connector 110, an error in V2L function, a temperature of the V2L connector 110 which is greater than or equal to a preset temperature, and the like.

The LED module 113 may control light emission of LED according to the warning state determined by the VCMS 122. In this instance, controlling the LED may be controlling a blinking cycle, blinking time, luminance, LED color, etc., of the LED.

According to an embodiment, the V2L connector 110 may further include a bimetal switch 114.

The bimetal switch 114 may be a rod-shaped component made by stacking and welding two types of thin metal plates having different thermal expansion coefficients. The bimetal switch 114 may measure a temperature by using a property that degrees of bending are different when heat is applied. An alloy of nickel (Ni) and iron (Fe) may be used as a metal with low thermal expansion, and an alloy of nickel, manganese and iron, an alloy of nickel, molybdenum and iron, and an alloy of nickel, manganese and copper may be used as a metal with high thermal expansion.

When the bimetal switch 114 is exposed to a low temperature, a portion that contracts well may bend faster and the rod may bend in the bending direction. When the bimetal switch 114 is exposed to a high temperature, a portion that expands well may bend faster and the rod may bend in the bending direction.

The bimetal switch 114 may embody a thermostat (temperature controller) using a principle of the rod bending. The thermostat may turn on or off the switch based on a predetermined temperature. The bimetal switch 114 may embody the thermostat without an additional external electrical circuit.

Because the V2L connector 110 further includes the bimetal switch 114, an accident may be prevented, for example, when an overtemperature prevention function by the thermistor element may not be performed.

According to an embodiment, the electric battery charging system 100 may include the vehicle 120 and the inlet 121 positioned on an outer surface of the vehicle 120.

The inlet 121 may be a charging port fixed to the vehicle 120 to insert the EVSE 200 and the V2L connector 110.

When a user connects the V2L connector 110 to the inlet 121, the battery may be discharged to supply power to an external home appliance, and when connecting the EVSE 200 to the inlet 121, the battery may be charged by receiving power from outside.

According to an embodiment, the electric battery charging system 100 may further include the VCMS 122 and a micro control unit (MCU) 123.

The VCMS 122 may refer to a controller of the vehicle 120 side which belongs to a vehicle controller that determines whether the V2L connector 110 is connected and a detected temperature, and thereby determining whether to discharge the battery.

The VCMS 122 may control to supply general power to the outside of the vehicle 120 without a separate additional device.

The MCU 123 may determine whether the V2L connector 110 is connected, and when the V2L connector 110 is connected to the inlet 121, may transmit a signal for supplying power to the NTC thermistor element 111. Also, the MCU 123 may receive a voltage value that changes according to a change in resistance value of the NTC thermistor element 111.

The MCU 123 may determine whether the V2L connector 110 is connected and receive the voltage value that changes according to a change in resistance value of the NTC thermistor element 111, and whether to discharge the battery is determined in the VCMS 122, and thus a stability of connector may be improved.

Figure 3:
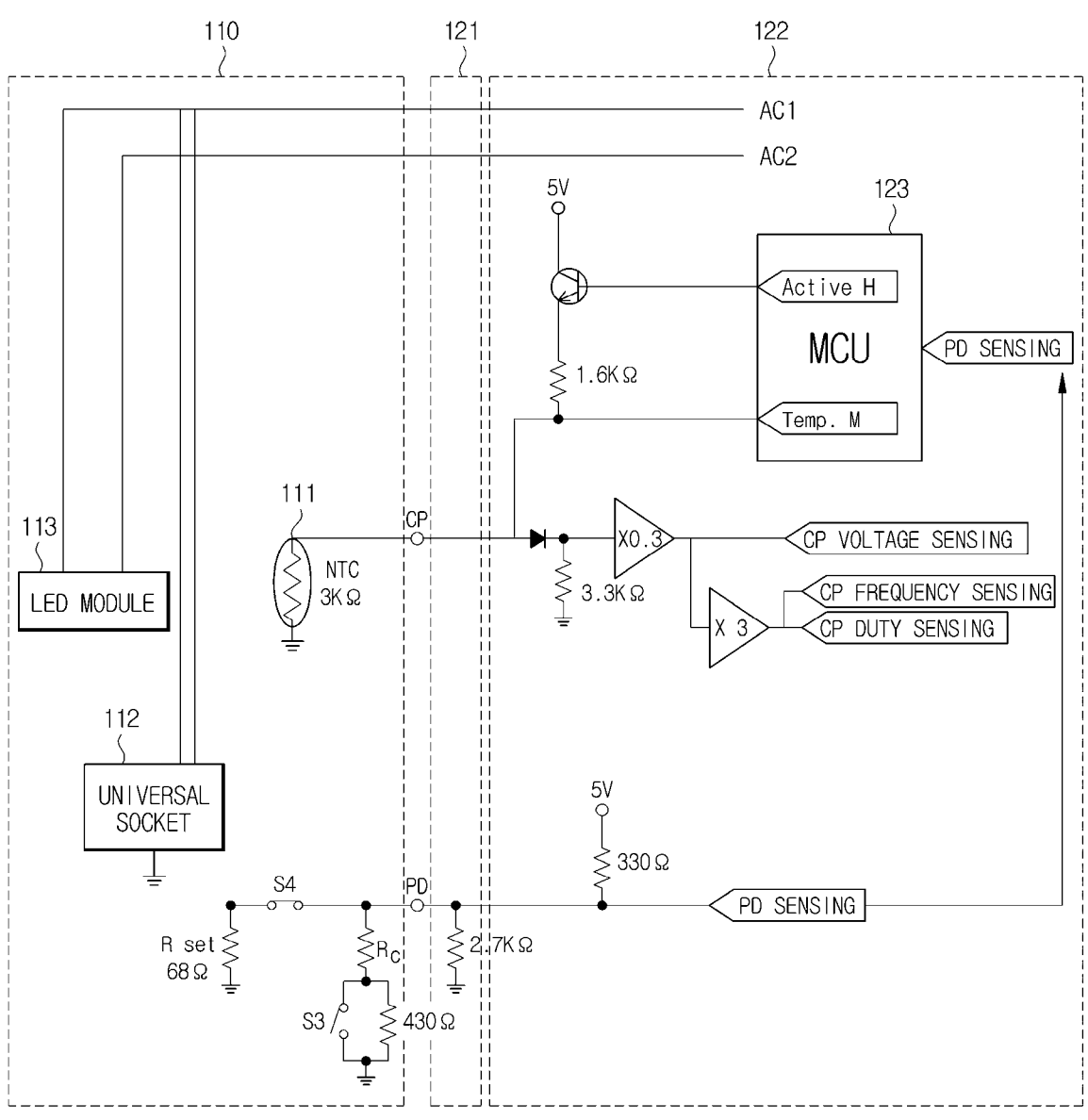
FIG. 3 is a schematic circuit diagram of an electric battery charging system according to an embodiment.

FIG. 3 is a schematic circuit diagram of the electric battery charging system according to an embodiment. An operation of the MCU 123 of the electric battery charging system 100 according to an embodiment is described in detail with reference to FIG. 3.

The MCU 123 may transmit a signal for supplying power to the NTC thermistor element 111 as the V2L connector 110 is connected.

The MCU 123 may determine whether the V2L connector 110 is connected, based on a voltage detected by a proximity detection (PD) sensor. That is, whether the V2L connector 110 is connected to the inlet 121 may be determined through PD sensing that detects a PD voltage output from a circuit connected to a proximity detection pin (PD).

That is, the MCU 123 may determine whether the V2L connector 110 is connected to the inlet 121 of the vehicle 120 based on the PD voltage output from the PD pin. In this instance, the PD voltage which is a reference to determine a connection state of the V2L connector 110 is determined by a PD voltage standard.

When it is determined that the V2L connector 110 is connected to the inlet 121 of the vehicle 120, the MCU 123 may transmit the signal for supplying power to the NTC thermistor element 111.

An NPN bipolar junction transistor may be used to transmit the signal for supplying power to the NTC thermistor element 111.

The NPN bipolar junction transistor may be a junction transistor made by bonding an N-type semiconductor and a P-type semiconductor, and the transistor may be a semiconductor device that amplifies or serves as a switch by controlling current or voltage flow.

In the NPN bipolar junction transistor, a switch may be turned on or off according to a signal transmitted to a base.

When the connection of the V2L connector 110 is determined through the PD sensing, the MCU 123 may transmit a signal (Active High) to the NPN bipolar junction transistor to turn on the switch, and supply power to the NTC thermistor element 111.

The NTC thermistor element 111 is an element that changes a resistance value according to temperature, and may be installed inside the connector.

Because the NTC thermistor element 111 changes a resistance value according to temperature, the NTC thermistor element 111 may determine a temperature by receiving power from the MCU 123.

Specifically, when a temperature around the connector increases, the NTC thermistor element 111 may reduce a resistance due to a property of a semiconductor that changes the resistance value according to temperature.

When the NTC thermistor element 111 reduces a resistance applied to the circuit, the MCU 123 may monitor a temperature change by detecting a voltage according to the reduced resistance.

Next, an operation of the VCMS 122 of the electric battery charging system 100 according to an embodiment is described with reference to FIG. 3.

When the MCU 123 monitors whether the V2L connector 110 is connected and the temperature of the V2L connector 110, the VCMS 122 may determine whether to discharge the battery based on the monitored sensing values.

The sensing values that the VCMS 122 considers to determine whether to discharge the battery may be a PD voltage, a control pilot (CP) voltage, a CP frequency and a CP duty.

Determination on whether to discharge may be made by the VCMS 122 based on whether the V2L connector 110 is connected or whether overtemperature occurs.

Specifically, the VCMS 122 may determine whether to discharge the battery by determining whether the V2L connector 110 is connected based on the PD voltage.

When the monitored PD voltage is greater than or equal to a preset reference voltage, the VCMS 122 may determine that the V2L connector 110 is not connected to the vehicle 120 and stop discharging.

Also, the VCMS 122 may determine whether to discharge the battery based on the CP voltage input through a CP line.

Because the CP line may use the same line of the existing V2L connector 110, an additional line is not required.

When a resistance of the NTC thermistor element 111 decreases as the temperature in the V2L connector 110 increases, the CP voltage also decreases. Accordingly, when the CP voltage is less than or equal to the preset reference voltage, the VCMS 122 may determine that overtemperature occurs and stop discharging.

Determination on whether to discharge may be made by the VCMS 122 based on whether the V2L connector 110 is connected or whether overtemperature occurs, and discharge may be controlled by one of the two conditions, and thus a stability of the V2L connector 110 may be secured.

The VCMS 122 may control the LED module 113 based on whether discharge by the V2L connector 110 is progressed or stopped.

The LED module 113 may be embodied by modularizing a plurality of LEDs, and be used to notify a user of whether the V2L connector 110 is connected and whether a V2L function operates.

The LED module 113 may be turned on according to a warning state determined by the VCMS 122. The warning state may refer to an abnormal operation state such as an error in connection state of the V2L connector 110, an error in V2L function, a temperature of the V2L connector 110 which is greater than or equal to a preset temperature, and the like.

The LED module 113 may control light emission of the LED according to the warning state determined by the VCMS 122. In this instance, controlling the LED may be controlling a blinking cycle, blinking time, luminance, LED color, etc., of the LED.

For example, by dividing temperature into several stages, when the temperature is below 20° C., a green light is displayed indicating a safe temperature, when the temperature is between 20° C. to 30° C., an orange light is displayed indicating a temperature that requires carefulness, and when 30° C. or higher, a red light, which may also be a blinking light, indicates a temperature that requires to notify of danger.

Figure 4:
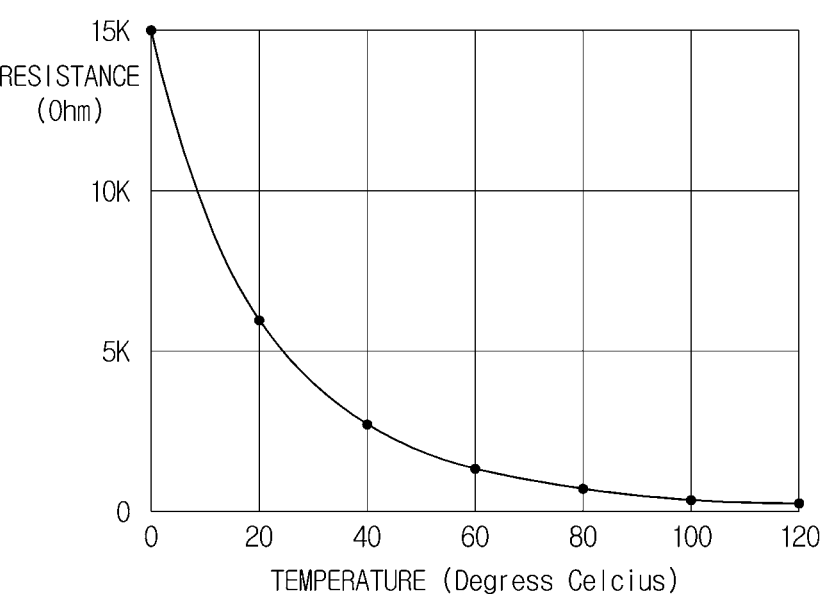
FIG. 4 is a diagram illustrating a resistance value according to a temperature of a negative temperature coefficient (NTC) thermistor element according to an embodiment.

FIG. 4 is a diagram illustrating a resistance value according to a temperature of the NTC thermistor element 111 according to an embodiment.

Referring to FIG. 4, it may be seen that a resistance value of the NTC thermistor element 111 decreases as the temperature increases. The NTC thermistor element 111 may have a resistance of approximately 6 KOhm at 20° C., a resistance of approximately 3 KOhm at 40° C., a resistance of approximately 6 KOhm at 60° C., and a resistance of approximately 1 KOhm at 80° C.

Because the resistance of the NTC thermistor element 111 changes at a relatively constant rate, compared to a PTC thermistor element and a CTR thermistor element, the vehicle 120 may be controlled by subdividing the temperature.

For example, a temperature range is divided into a low temperature, medium temperature, high temperature and overtemperature, and depending on a corresponding temperature, whether to discharge the battery is determined and output may vary, thereby allowing a user to receive constant power regardless of the season or weather.

FIG. 5 is a diagram illustrating a voltage by a PD sensor detected in the electric battery charging system 100 according to an embodiment.

Referring to a table of FIG. 5, when a PD voltage output from a PD pin is less than or equal to 0.482 V, it may be determined that a user is using the V2L connector 110 because the vehicle 120 is connected to the V2L connector 110 and a power button of the V2L connector 110 is pressed.

Also, when the PD voltage output from the PD pin is within a range between 0.482 V and 0.754 V, it may be determined that the vehicle 120 is connected to the V2L connector 110.

Also, when the PD voltage output from the PD pin is within a range between 0.754 V and 0.905 V, it may be determined that the user is not using the V2L connector 110 because the power button of the V2L connector 110 is not pressed.

When the PD voltage output from the PD pin is greater than or equal to 0.905 V, it may be determined that the vehicle 120 is not connected to the V2L connector 110, i.e., the vehicle 120 is separated from the V2L connector 110.

In this instance, the PD voltage may be output to satisfy a PD voltage standard depending on a pre-designed hardware configuration of the inlet 121 or the V2L connector 110, such as a resistance value of resistor element included in the EVSE 200 and the connector, a resistance value of the resistor element included in the inlet 121 of the vehicle 120, and the like.

Figure 6:
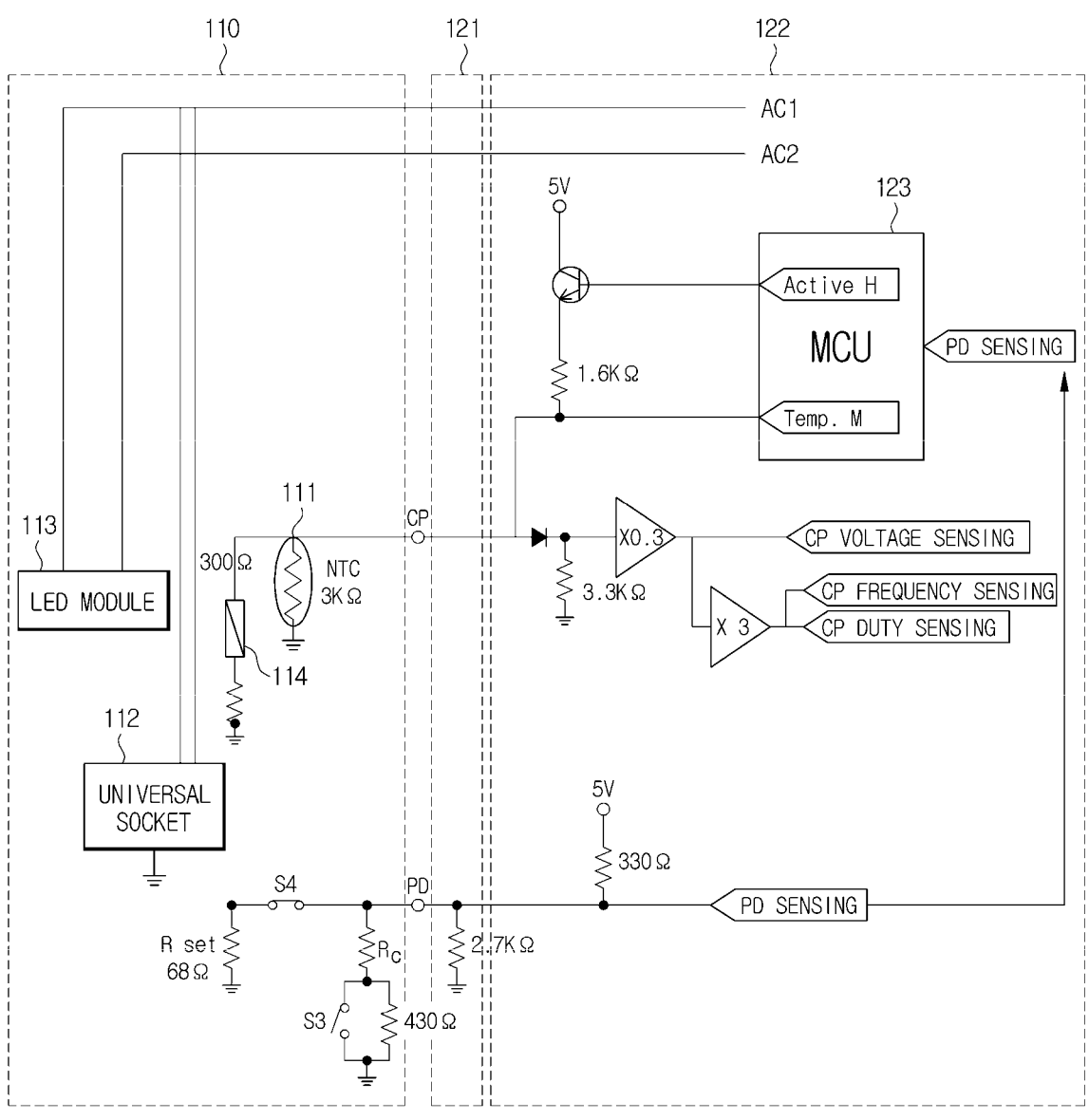
FIG. 6 is a schematic circuit diagram of an electric battery charging system according to another embodiment.

FIG. 6 is a schematic circuit diagram of the electric battery charging system 100 according to another embodiment.

Referring to FIG. 6, the circuit may further include the bimetal switch 114 for preventing overtemperature.

The bimetal switch 114 may embody a thermostat using a principle of the rod bending. The bimetal switch 114 may embody the thermostat without an additional external electrical circuit, and the thermostat may turn on/off a switch based on a predetermined temperature.

Because the V2L connector 110 further includes the bimetal switch 114, an accident may be prevented, for example, when a temperature detection may not be performed by the NTC thermistor element 111.

The bimetal switch 114 may be provided inside the V2L connector 110 and be connected in series with the NTC thermistor element 111.

The bimetal switch 114 may be configured to function as a switch by attaching a contact point to an end of a bimetal lead. When a temperature of the V2L connector 110 is higher than a preset reference temperature, the bimetal switch 114 may turn off the switch.

When the NTC thermistor element 111 or a circuit connecting the NTC thermistor element 111 is defective, the bimetal switch 114 may replace the NTC thermistor element 111.

When the NTC thermistor element 111 is defective, the NTC thermistor element 111 may not change a resistance according to temperature and a CP voltage may not be decreased, and thus a control overtemperature may not be determined. Accordingly, the VCMS 122 may not stop discharging even in an overtemperature state.

To prevent the state described above, the bimetal switch 114 may be further included. Even when the NTC thermistor element 111 is defective, the bimetal switch 114 may cut off power in the overtemperature state by using the principle of bending of a metal rod without an additional circuit.

According to an embodiment, when the V2L connector 110 further includes the bimetal switch 114, discharge may be controlled even in the event of malfunction of the NTC thermistor element 111, thereby reducing a likelihood of a safety accident.

Figure 7:
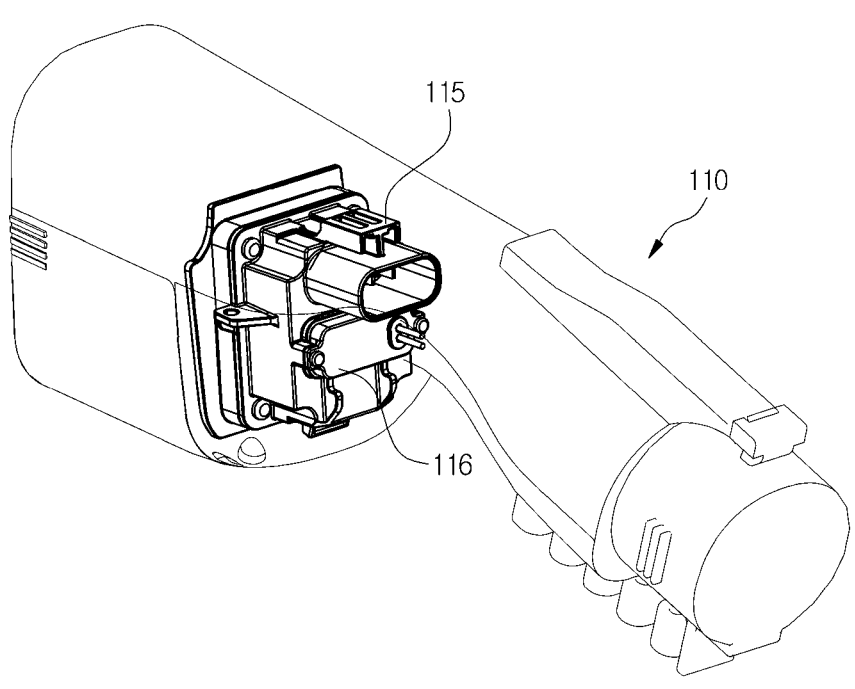
FIG. 7 is a diagram illustrating a configuration of a vehicle to load (V2L) connector in an electric battery charging system according to an embodiment.
Figure 8:
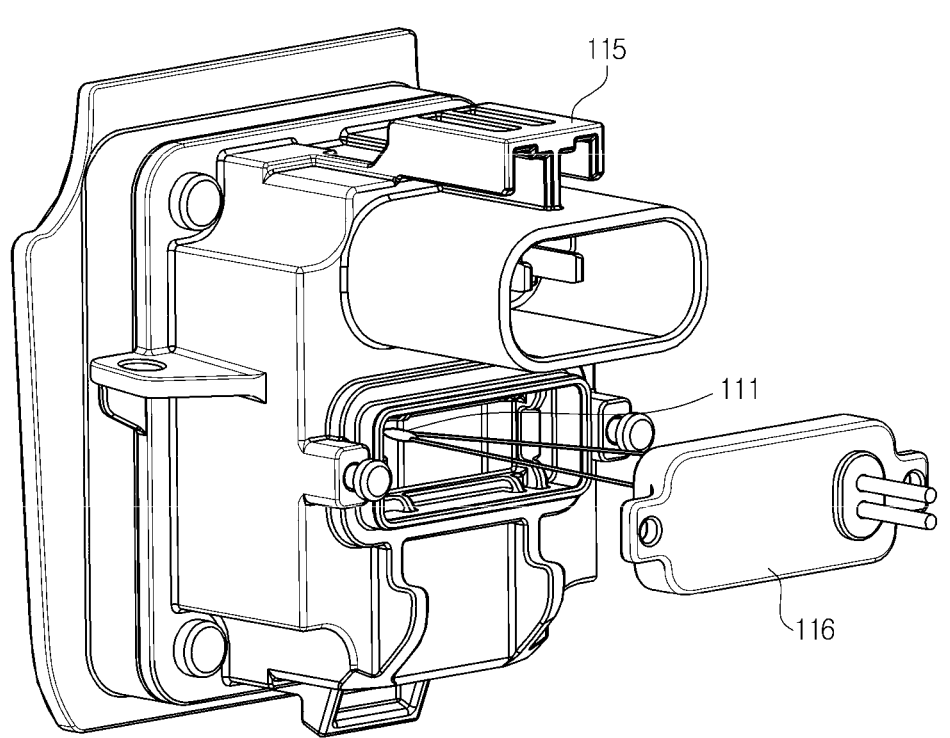
FIG. 8 is a diagram illustrating a V2L connector including an NTC thermistor element in an electric battery charging system according to an embodiment.

FIG. 7 is a diagram illustrating a configuration of the V2L connector 110 according to an embodiment, and FIG. 8 is a diagram illustrating the V2L connector 110 including the NTC thermistor element 111 in the electric battery charging system 100 according to an embodiment.

Referring to FIGS. 7 and 8, it may be seen that the NTC thermistor element 111 is provided in an internal terminal 115 of the V2L connector 110.

The NTC thermistor element 111 may be provided so that a head of the NTC thermistor element 111 is in contact with the internal terminal 115 of the V2L connector 110. A temperature inside the connector may be accurately measured by physical contact.

Because the NTC thermistor element 111 has a size of several millimeters, the NTC thermistor element 111 may be located inside the V2L connector 110. Accordingly, even when the electric battery charging system 100 according to an embodiment is applied to the V2L connector 110, a volume may not be significantly increased.

The NTC thermistor element 111 may be provided at a position where a sealing structure is formed by a cover 116 in the internal terminal 115 of the V2L connector 110.

A risk of electric shock exists, in that the electric battery charging system 100 according to an embodiment uses a battery for the vehicle 120, i.e., an electric vehicle, and the vehicle 120 is used outside. Accordingly, moisture is required to be blocked.

Because the V2L connector 110 uses an electric battery, a poor connection may be caused due to moisture and allowable contact voltage may be lowered due to an occurrence of an electrical leak, thereby causing a dangerous state.

The allowable contact voltage refers to a voltage applied between feet of a person who is in contact with the ground and other body parts. The smaller the allowable contact voltage, the higher the risk of electric shock.

Because the V2L connector 110 includes a metal electrical device, a part of human body may be in contact with the metal electrical mechanical device or structure during discharge. Accordingly, when a user touches the V2L connector 110 on a rainy day or with a wet hand, exceeding a safety voltage and causing an electric shock accident that damages a human body.

To prevent the above accident, in the V2L connector 110 according to an embodiment, the NTC thermistor element 111 may be configured in a sealed structure.

The NTC thermistor element 111 may be provided on a terminal surface inside the V2L connector 110, and be sealed by the cover 116.

Accordingly, the NTC thermistor element 111 may prevent the circuit from being exposed to moisture, and prevent a safety accident such as electric shock.

Figure 9:
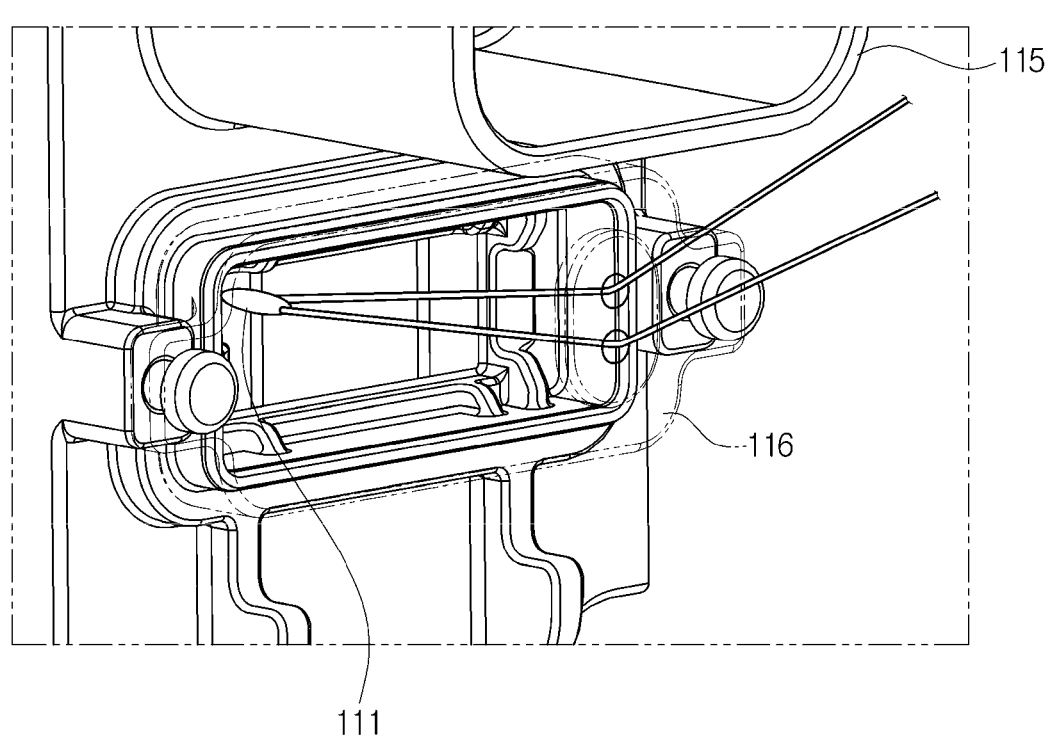
FIG. 9 is a diagram illustrating a waterproof structure for an NTC thermistor element in an electric battery charging system according to an embodiment.

FIG. 9 is a diagram illustrating a waterproof structure for the NTC thermistor element 111 in the electric battery charging system 100 according to an embodiment.

Referring to FIG. 9, the NTC thermistor element 111 may be sealed at the internal terminal 115 of the V2L connector 110 to prevent an electric shock accident.

The NTC thermistor element 111 may be completely sealed by the cover 116 and the V2L connector 110, and a circuit of the NTC thermistor element 111 may be wired through a separate discharge port (not shown).

The discharge port (not shown) may also be made of a material such as silicon, rubber, etc., which is impermeable to moisture, and may be configured in close contact with the cover 116.

Accordingly, the NTC thermistor element 111 is completely sealed inside the V2L connector 110, and thus a likelihood of electric shock due to moisture may be significantly decreased.

Figure 10:
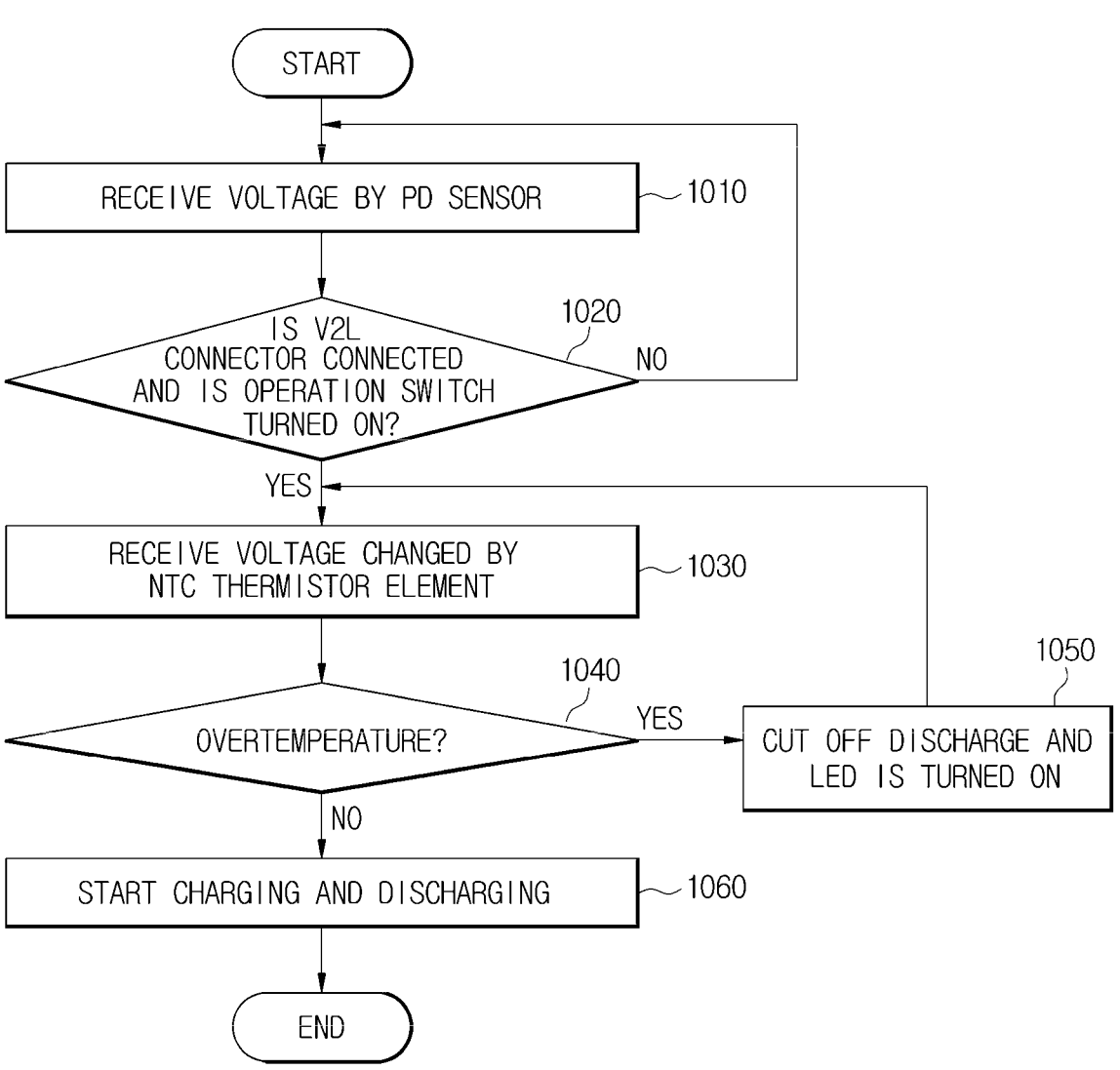
FIG. 10 is a flowchart illustrating a control method of an electric battery charging system according to an embodiment.

FIG. 10 is a flowchart illustrating a control method of the electric battery charging system 100 according to an embodiment.

Referring to FIG. 10, first, the electric battery charging system 100 may be implemented when the MCU 123 receives a PD voltage to check whether the V2L connector 110 is connected.

A voltage may be detected by a PD sensor (1010), so that the MCU 123 determines whether the V2L connector 110 is connected. That is, whether the V2L connector 110 is connected to the inlet 121 may be determined (1020), through PD sensing that detects a PD voltage output from a circuit connected to a PD pin.

Afterwards, when it is not confirmed whether the V2L connector 110 is connected to the vehicle 120 (No in operation 1020), the PD voltage is continuously detected. When it is confirmed that the V2L connector 110 is connected to the vehicle 120 and an operation switch is turned on (Yes in operation 1020), a voltage changed by the NTC thermistor element 111 may be received (1030) to measure a temperature.

Because the NTC thermistor element 111 changes a resistance value according to temperature, the NTC thermistor element 111 may measure the temperature by receiving power from the MCU 123.

Specifically, when the temperature around the connector increases, the NTC thermistor element 111 may reduce a resistance due to a property of semiconductor that changes the resistance value according to temperature.

When the NTC thermistor element 111 reduces the resistance applied to a circuit, the MCU 123 may monitor a temperature change (1030) by detecting the voltage according to the reduced resistance (1040).

Next, when the VCMS 122 determines the temperature of the V2L connector 110 as overtemperature (Yes in operation 1040), discharge may be cut off and an LED may be turned on (1050).

Specifically, the VCMS 122 may control the LED module 113 based on whether the discharge by the V2L connector 110 is progressed or stopped.

The LED module 113 may be embodied by modularizing a plurality of LEDs, and may be used to notify a user of whether the V2L connector 110 is connected and whether the V2L function operates.

The LED module 113 may be turned on according to a warning state determined by the VCMS 122. The warning state may refer to an abnormal operation state such as an error in connection state of the V2L connector 110, an error in V2L function, a temperature of the V2L connector 110 which is greater than or equal to a preset temperature, and the like.

The LED module 113 may control light emission of the LED according to the warning state determined by the VCMS 122. In this instance, controlling the LED may be controlling a blinking cycle, blinking time, luminance, LED color, etc., of the LED.

When it is determined that the V2L connector 110 is connected, the operation switch is turned on, and the temperature of the V2L connector 110 is not overtemperature (No in operation 1040), the VCMS 122 may control to start charging or discharging (1060).

As is apparent from the above, according to the embodiments of the disclosure, injury to users and damage to property such as a vehicle due to overtemperature caused when using a V2L technology can be prevented.

Also, a volume increase of a V2L connector can be minimized by using a small temperature sensor, and safety of the V2L connector can be secured by determining overtemperature based on a standard of an existing V2L connector.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An electric battery charging system, comprising:
a connector comprising a thermistor element configured to change a resistance value according to a temperature;
a micro control unit (MCU) configured to receive a voltage varying depending on whether the connector is connected, and receive a voltage varying according to the resistance value of the thermistor element; and
a vehicle charging management system (VCMS) configured to determine whether to discharge a battery based on whether the connector is connected and a temperature of the connector,
wherein the electric battery charging system further comprises a proximity detection (PD) sensing circuit, when a PD voltage detected by the PD sensing circuit is less than or equal to a threshold voltage value, the micro control unit (MCU) determines that the connector is connected to a vehicle and a switch indicating a power button is closed.

2. The electric battery charging system of claim 1, wherein the thermistor element comprises a negative temperature coefficient (NTC) thermistor element.

3. The electric battery charging system of claim 2, wherein the VCMS is configured to stop discharging the battery, when a voltage varying according to a resistance value of the NTC thermistor element is less than or equal to a preset reference value.

4. The electric battery charging system of claim 1, wherein the connector further comprises a proximity detection sensor configured to detect the voltage varying depending on whether the connector is connected.

5. The electric battery charging system of claim 1, wherein the VCMS is configured to stop discharging the battery, when the voltage varying depending on whether the connector is connected is greater than or equal to a preset reference value.

6. The electric battery charging system of claim 3, wherein the connector further comprises a light emitting diode (LED) configured to light up based on stop of discharge.

7. The electric battery charging system of claim 1, wherein the connector further comprises a bimetal switch configured to cut off power according to the temperature of the connector.

8. The electric battery charging system of claim 1, wherein the thermistor element is sealed inside the connector to prevent ingress of moisture.

9. A vehicle, comprising:
an MCU configured to receive a voltage varying depending on whether a connector is connected, and comprise a thermistor element that changes a resistance value according to a temperature and receive a voltage varying according to the resistance value of the thermistor element; and
a VCMS configured to determine whether to discharge a battery based on whether the connector is connected and a temperature of the connector,
wherein the vehicle further comprises a proximity detection (PD) sensing circuit, when a PD voltage detected by the PD sensing circuit is less than or equal to a threshold voltage value, the MCU determines that the connector is connected to the vehicle and a switch indicating a power button is closed.

10. The vehicle of claim 9, wherein the thermistor element comprises a NTC thermistor element.

11. The vehicle of claim 10, wherein the VCMS is configured to stop discharging the battery, when a voltage varying according to a resistance value of the NTC thermistor element is less than or equal to a preset reference value.

12. The vehicle of claim 9, wherein the connector further comprises a proximity detection sensor configured to detect the voltage varying depending on whether the connector is connected.

13. The vehicle of claim 9, wherein the VCMS is configured to stop discharging the battery, when the voltage varying depending on whether the connector is connected is greater than or equal to a preset reference value.

14. The vehicle of claim 11, wherein the connector further comprises a LED configured to light up based on stop of discharge.

15. The vehicle of claim 9, wherein the connector further comprises a bimetal switch configured to cut off power according to the temperature of the connector.

16. The vehicle of claim 9, wherein the thermistor element is sealed inside the connector to prevent ingress of moisture.

17. A control method of an electric battery charging system, the control method comprising:
receiving a voltage varying depending on whether a connector is connected, the connector comprising a thermistor element configured to change a resistance value according to a temperature;
receiving a voltage varying according to the resistance value of the thermistor element;
determining whether the connector is connected and a temperature of the connector; and
determining whether to discharge a battery based on whether the connector is connected and the temperature of the connector,
wherein when a proximity detection (PD) voltage detected by a PD sensing circuit is less than or equal to a threshold voltage value, the method comprises determining that the connector is connected to a vehicle and a switch indicating a power button is closed.

18. The control method of claim 17, further comprising:

when the thermistor element is an NTC thermistor element and a voltage varying by the NTC thermistor element is less than or equal to a preset reference value, stopping discharge.

19. The control method of claim 17, further comprising:

detecting, by a proximity detection sensor comprised in the connector, the voltage varying depending on whether the connector is connected; and when the detected voltage is greater than or equal to a preset reference voltage, determining that the connector is disconnected and stopping discharge.

20. The control method of claim 18, wherein the connector further comprises a LED configured to light up based on stop of discharge.

* * * * *